United States Patent
Fox et al.

(10) Patent No.: US 6,278,927 B1
(45) Date of Patent: Aug. 21, 2001

(54) TRANSFER CASE RATIO DIAGNOSTIC METHOD FOR A MOTOR VEHICLE POWERTRAIN

(75) Inventors: Christopher Ray Fox, Martinsville; Scott E Mundy; Sean E Gleason, both of Indianapolis; Jeffrey Kurt Runde, Fishers, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/577,256

(22) Filed: May 22, 2000

(51) Int. Cl.⁷ .................................................. B60K 17/34
(52) U.S. Cl. ............................................. 701/62; 477/154
(58) Field of Search ................................... 701/51, 60, 61, 701/62, 58, 66; 477/154, 906, 155, 46, 48, 49

(56) References Cited

U.S. PATENT DOCUMENTS

| | | | |
|---|---|---|---|
| 4,070,927 | 1/1978 | Polak | 74/765 |
| 4,698,764 * | 10/1987 | Inagaki et al. | 364/424.1 |
| 4,707,789 * | 11/1987 | Downs et al. | 364/424.1 |
| 5,016,724 * | 5/1991 | Steinhagen et al. | 180/197 |
| 5,601,506 | 2/1997 | Long et al. | 475/120 |
| 5,605,201 * | 2/1997 | McGinn et al. | 180/233 |
| 5,609,550 * | 3/1997 | Saxena et al. | 477/166 |
| 5,873,281 * | 2/1999 | Stasik et al. | 74/335 |
| 5,927,426 * | 7/1999 | Hall et al. | 180/249 |
| 5,957,810 * | 9/1999 | Ohashi et al. | 477/154 |
| 6,081,760 * | 6/2000 | Dreibholz et al. | 701/62 |
| 6,098,003 * | 8/2000 | Kozaki et al. | 701/51 |

* cited by examiner

Primary Examiner—Tan Nguyen
Assistant Examiner—Dalena Tran
(74) Attorney, Agent, or Firm—Laura C. Hargitt

(57) ABSTRACT

An improved diagnostic control method for a motor vehicle powertrain including an electronically controlled multi-range transmission and a multi-range transfer case, wherein a default determination of transfer case range enables reliable evaluation of transmission ratio, for powertrain configurations with or without a transfer case range indicator switch. An overall speed ratio is computed according to a ratio of the transmission input speed and the transfer case output speed, and the computed ratio is monitored to identify a period of stable operation at the conclusion of transmission shifting and in steady state operation during which the rate of change of the computed ratio is stable over a predefined interval. If the computed ratio is also deemed to be stable, it is compared with an expected overall ratio based on an assumed speed range (low or high) of the transfer case. In configurations having a transfer case indicator switch, the switch state determines the assumed speed range, whereas in configurations not having an indicator switch, a low range of the transfer case is assumed. A default condition of the transfer case is determined based on the ratio comparison, and transmission diagnosis is carried out based on the default conditions.

7 Claims, 3 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

TRANSFER CASE RATIO DIAGNOSTIC METHOD FOR A MOTOR VEHICLE POWERTRAIN

TECHNICAL FIELD

This invention relates to an electronically controlled motor vehicle powertrain including a multi-range automatic transmission and a multi-range transfer case, and more particularly to a control for indicating the range of the transfer case.

BACKGROUND OF THE INVENTION

A significant aspect of electronic transmission control involves monitoring powertrain parameters to determine if the controlled friction elements (clutches, brakes, etc.) of the transmission have properly engaged or disengaged. For example, a proper engagement state of the transmission clutches may be verified by computing the transmission speed ratio (input speed/output speed) and comparing it with the several possible discrete speed ratios of the transmission. As a practical matter, however, only a limited number of parameters can be economically measured, and the monitored data is frequently ambiguous. For example, in certain powertrain configurations where the transmission drives the vehicle wheels through a multi-range transfer case (as in four-wheel-drive applications), the output speed measurement is based on the transfer case output speed instead of the transmission output speed. Since the transfer case provides two different speed ranges, the transmission ratio cannot be unambiguously determined unless the transfer case speed ratio is known. While some transfer cases are equipped with a speed range indicator switch, a failure of the indicator switch is also possible. Accordingly, what is needed is a diagnostic control for enabling reliable determination of proper transmission operation in powertrain configurations of the above type.

SUMMARY OF THE INVENTION

This invention is directed to an improved diagnostic control method for a motor vehicle powertrain including an electronically controlled multi-range transmission and a multi-range transfer case, wherein a default determination of transfer case range enables reliable evaluation of transmission ratio, for powertrain configurations with or without a transfer case range indicator switch. According to the invention, an overall speed ratio is computed according to a ratio of the transmission input speed and the transfer case output speed, and the computed ratio is monitored to identify a period of stable operation at the conclusion of transmission shifting and in steady state operation during which the rate of change of the computed ratio is stable over a predefined interval. If the computed ratio is also deemed to be stable, it is compared with an expected overall ratio based on an assumed speed range (low or high) of the transfer case. In configurations having a transfer case indicator switch, the switch state determines the assumed speed range, whereas in configurations not having an indicator switch, a low range of the transfer case is assumed. A default condition of the transfer case is determined based on the ratio comparison, and transmission diagnosis is carried out based on the default conditions.

BRIEF DESCRIPTION OF THE DRAWINGS

FIG. 3 is a high level flow diagram of a main or executive program, and

FIG. 4 details a portion of the flow diagram of FIG. 3 concerning the transfer case range default logic of this invention.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
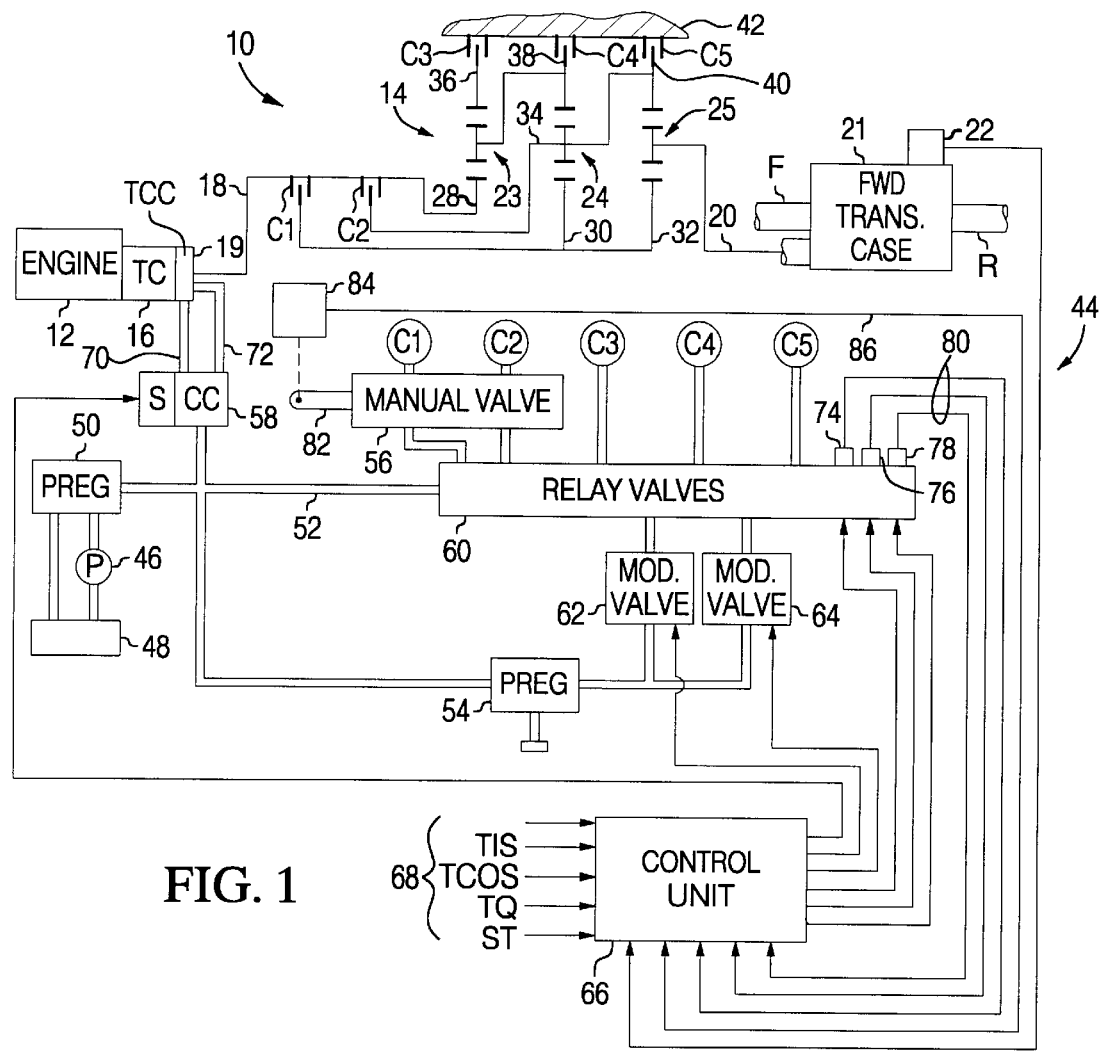
FIG. 1 is a diagram of an automatic transmission and microprocessor-based control unit for carrying out the control of this invention.
FIG. 2 is a diagram indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a two-speed transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions. Optionally, the transfer case 21 may be equipped with a switch 22 indicating when a specified range (such as high range) is engaged.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64. The electronic portion of the control is primarily embodied in the microprocessor-based control unit 66, which suitably activates the solenoid operated fluid control valves 58–64 based on a number of inputs 68 to achieve a desired transmission speed ratio. The inputs 68 may include, for example, signals representing the transmission input speed TIS, the driver torque command TQ, and in the illustrated embodiment, the transfer case output speed TCOS, and optionally the output of transfer case switch 22. Sensors for developing such signals may be conventional in nature, and have been omitted for simplicity. Additionally, the control lever 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch. Then the modulated valves 62, 64 (which may include current controlled force motors, for example) are controlled to smoothly engage the on-coming clutch while smoothly disengaging the off-going clutch. The fluid controlled valve 58 is also a modulated valve, and controls the fluid supply path to converter clutch 19 in lines 70, 72 for selectively engaging and disengaging the converter clutch 19.

The present invention is directed to a diagnostic control method for powertrain 10, and more particularly to a method of determining a default condition of the transfer case 21 for purposes of diagnosing proper operation of the transmission 14. In general, diagnosing proper operation of the various clutches C1–C5 involves computing an overall speed ratio between the transmission input speed TIS and the transfer case output speed TCOS. As discussed above, however, the transmission speed ratio (that is, the ratio between input shaft 18 and output shaft 20) cannot be directly inferred from the overall ratio since the transfer case 21 is a multiple speed ratio device. Typically, the drive connection of the transfer case 21 is manually controlled by the operator of the vehicle, and has a number of possible operating conditions, including: neutral, two-wheel-high, four-wheel-high, and four-wheel-low. Although a high/low indicator switch 22 may be provided in certain configurations, its reliability maybe questionable, and in any event, it is desirable that the control unit 66 work with either configuration.

The present invention provides a default determination of transfer case range that enables reliable evaluation of transmission ratio, for powertrain configurations with or without a transfer case range indicator switch. According to the invention, an overall speed ratio is computed and monitored to identify a period of stable operation at the conclusion of transmission shifting and in steady state operation during which the rate of change of the computed ratio is stable over a predefined interval. If the computed ratio is also deemed to be stable, it is compared with an expected overall ratio based on an assumed speed range (low or high) of the transfer case. In configurations having a transfer case indicator switch, the switch state determines the assumed speed range, whereas in configurations not having an indicator switch, a low range of the transfer case is assumed. A default condition of the transfer case is determined based on the ratio comparison, and transmission diagnosis is carried out based on the default conditions.

Figure 3:
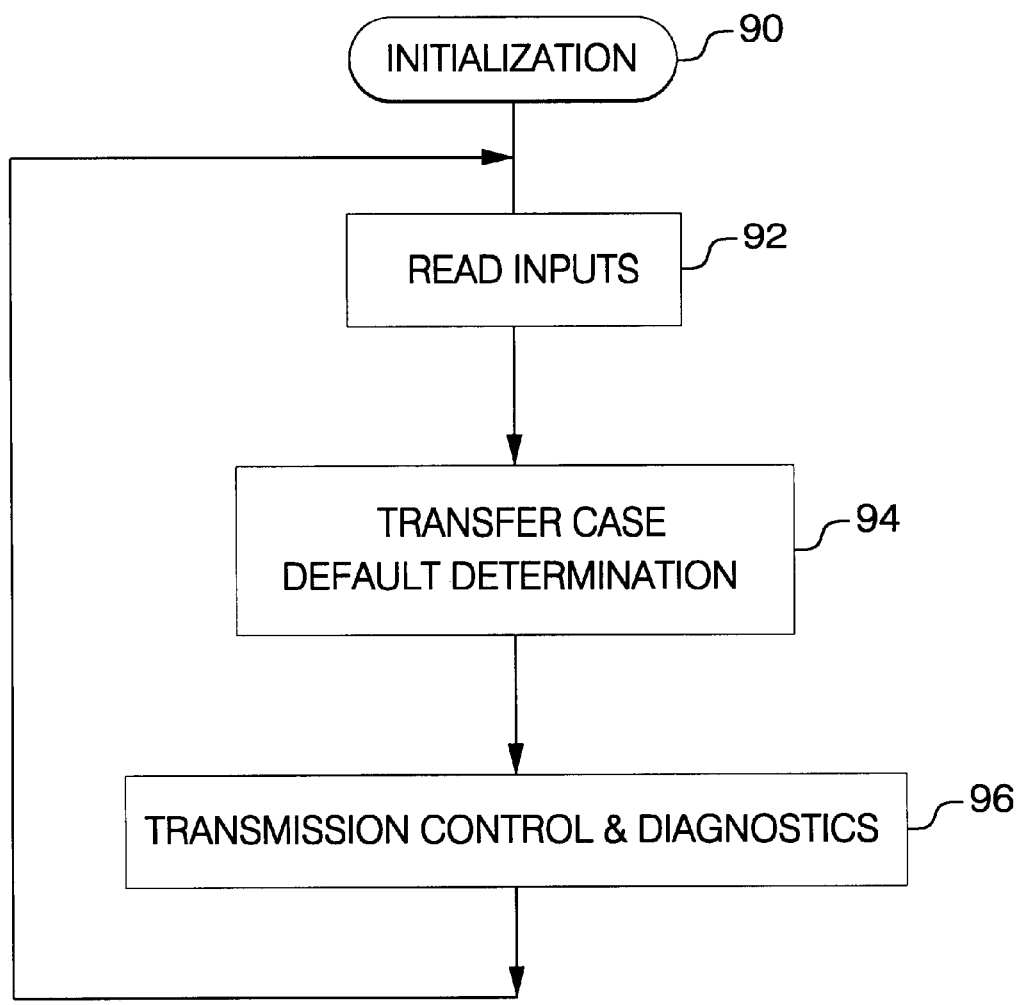
FIGS. 3 and 4 are flow diagrams representative of computer program instructions executed by the control unit of FIG. 1 in carrying out the control of this invention.
Figure 4:
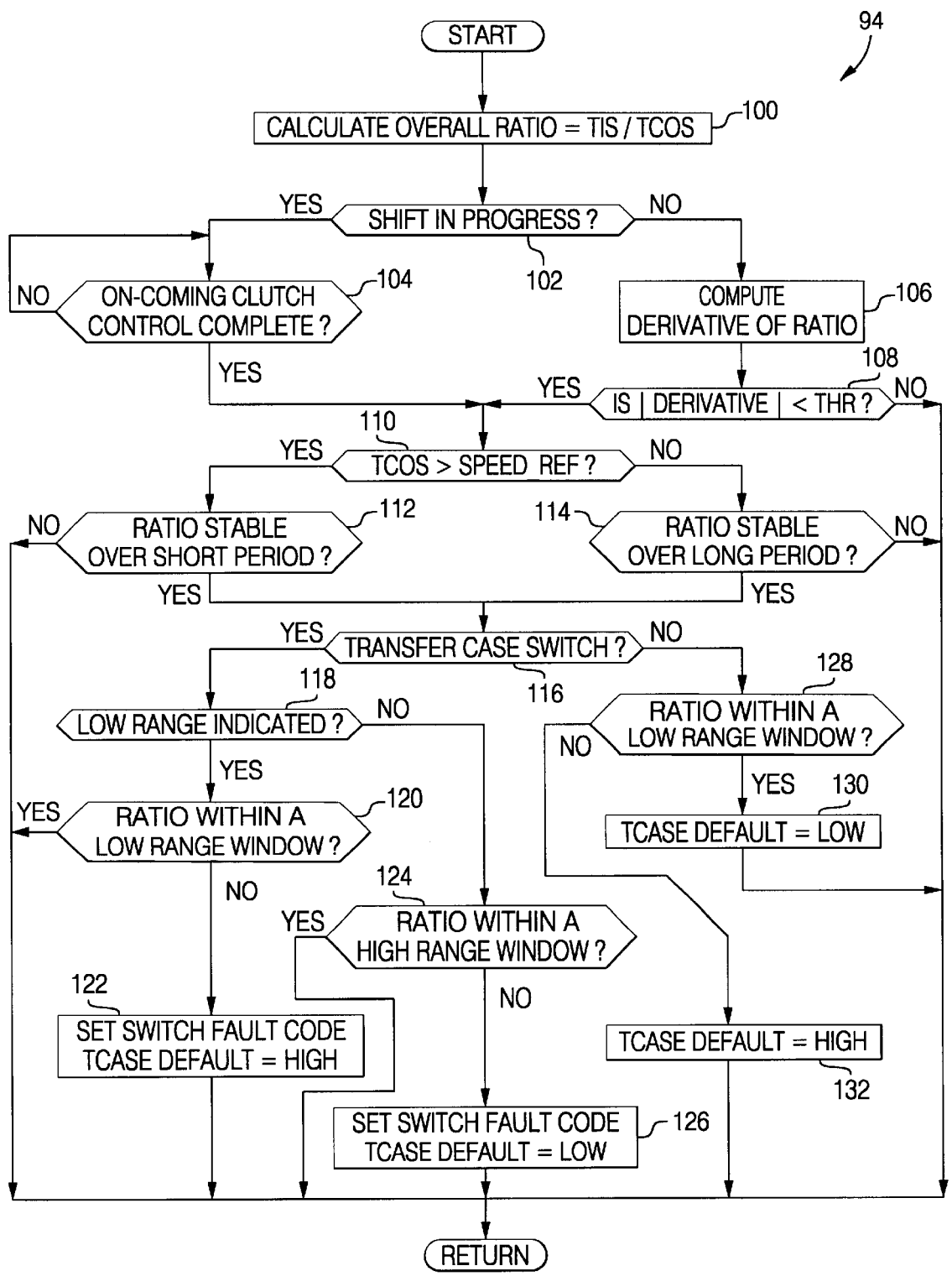

FIGS. 3 and 4 are flow diagrams representative of computer program instructions executed by the control unit 66 of FIG. 1 in carrying out the above-described diagnostic control. FIG. 3 is a high level diagram of a main or executive program, and FIG. 4 details a portion of the flow diagram of FIG. 3 concerning the transfer case range default determination according to this invention.

Referring to FIG. 3, the reference numeral 90 generally designates a series of initialization instructions performed at the initiation of vehicle operation for initializing various parameters and flags to a known state. Thereafter, the blocks 92, 94 and 96 are sequentially and repeatedly executed to read the various inputs discussed above in reference to FIG. 1, to determine the default status of the transfer case 21, and to carry out the transmission control and diagnostic functions. The default status determined at block 94 is used in block 96 to schedule transmission shifting and to verify that the commanded transmission speed ratio is in fact engaged, or to identify a condition of excessive clutch slippage.

Referring to FIG. 4, the determination of the transfer case default status involves identifying a stable operating condition of the transmission, determining if the computed overall ratio is stable, and comparing the computed overall ratio with an expected overall ratio based on an assumed speed range of the transfer case 21. Initially, the block 100 computes the overall ratio as (TIS/TCOS). The blocks 102–108 determine if the transmission 14 operating condition is stable. If a shift is in progress, as determined at block 102, the block 104 delays further execution of the routine until the control of the oncoming clutch involved in the shift is complete. This information can be determined from the transmission control of block 96, which schedules the pressure profiles for the on-coming and off-going clutches C1–C5. If a shift is not in progress, the block 106 computes the first derivative (rate of change with respect to time) of the computed ratio, and the block 108 determines if the magnitude of the derivative is less than a predetermined threshold THR. When either of the blocks 104 or 108 is answered in the affirmative, the blocks 110–114 are executed to determine if the computed ratio is stable. In general, this is achieved simply by comparing successively computed values of the overall speed ratio over a given time period and identifying a condition under which the deviation among such values is very small. If the output speed TCOS is relatively high (i.e., greater than a reference SPEED_REF), as determined at block 110, the block 112 is executed to make the stability determination based on a first time interval. At lower output speeds, the block 114 is executed to make the stability determination based on a second time interval that is longer than the first time interval; this takes advantage of the fact that the speed data rate increases with increasing output speeds.

The block 116 then determines if the transfer case 21 includes a high/low range indicator switch such as the switch 22 in FIG. 1. If so, the blocks 118–126 are executed to determine if the switch 22 is operating properly and to determine the default state of transfer case 21. If the switch 22 indicates that the LOW range is engaged, as determined at block 118, block 120 compares the computed overall ratio to a speed ratio window based on the commanded transmission speed ratio and the low range speed ratio provided by the transfer case 21. The window allows for minor variations of the computed speed ratio. If the computed ratio is within the window, the default status can be determined based on the switch status, and the routine is exited. If the computed ratio is outside the window, the switch status is inconsistent with the measured operation of the transmission 14, and the block 122 is executed to set a fault code for the switch 22 and to set the transfer case default status to HIGH, indicating that the high range of the transfer case 21 is engaged. If the switch 22 is indicating that the HIGH range is engaged, the block 124 compares the computed overall ratio to a speed ratio window based on the commanded transmission speed ratio and the high range speed ratio provided by the transfer case 21. If the computed ratio is within the window, the default status can be determined based on the switch status, and the routine is exited. If the computed ratio is outside the window, the switch status is inconsistent with the measured operation of the transmission 14, and the block 126 is executed to set a fault code for the switch 22 and to set the transfer case default status to LOW, indicating that the low range of the transfer case 21 is engaged.

If block 116 determines that the transfer case 21 does not provide a high/low range indicator switch 22 (or that the switch signal is not provided as an input to the control unit 66), the blocks 128–132 determine the transfer case default status assuming that the LOW range is engaged. The LOW range is assumed in this case because transmission shifting occurs at lower vehicle speeds when the transfer case 21 is in the low range, providing earlier default determination than if the high range is assumed. Thus, the block 128 compares the computed overall ratio to a speed ratio window based on the commanded transmission speed ratio and the low range speed ratio provided by the transfer case 21. If the computed ratio is within the window, the block 130 is executed to set the transfer case default status to LOW, indicating that the low range of the transfer case 21 is engaged. If the computed ratio is outside the window, the assumed status is inconsistent with the measured operation of the transmission 14, and the block 132 is executed to set the transfer case default status to HIGH, indicating that the high range of the transfer case 21 is engaged.

In summary, the diagnostic method of this invention reliably determines the status of the multi-range transfer case 21, removing ambiguity regarding the speed ratio of the transmission 14, and enabling reliable diagnosis of transmission operation. While described in reference to the illustrated embodiments, it is expected that various modifications in addition to those mentioned above will occur to those skilled in the art. For example, the transfer case 21 may have more than two ranges. Thus, it will be understood that diagnostic methods incorporating these and other modifications may fall within the scope of this invention, which is defined by the appended claims.

What is claimed is:

1. A diagnostic method for verifying that a speed ratio provided by a motor vehicle multi-speed ratio automatic transmission corresponds to a commanded speed ratio, where the transmission has an input coupled to an engine and an output coupled to a transfer case providing first or second speed ratios, and the transfer case has an output coupled to drive the vehicle, the method comprising the steps of:

measuring an input speed corresponding to a rotational speed of the transmission input and an output speed corresponding to a rotational speed of the transfer case output;

computing an overall speed ratio provided by said transmission and transfer case based on the measured input and output speeds;

determining if the transmission satisfies predetermined stability criteria;

determining if the computed overall ratio is stable over a given time interval;

comparing the computed overall ratio to a window of ratios based on the commanded speed ratio and an assumed speed ratio of said transfer case, once it is determined that the transmission satisfies the predetermined stability criteria and that the computed ratio is stable over the given time interval;

indicating the speed ratio provided by the transfer case based on the comparison of said computed overall ratio to said window of ratios; and verifying that the speed ratio provided by the transmission corresponds to the commanded speed ratio based on the computed overall speed ratio and the indicated speed ratio of said transfer case.

2. The diagnostic method of claim 1, wherein the transmission includes an on-coming clutch that is controlled to complete a shift to the commanded speed ratio, and the step of determining if the transmission satisfies predetermined stability criteria includes determining if the control of the on-coming clutch is completed.

3. The diagnostic method of claim 1, where no external indication of the speed ratio provided by the transfer case is provided, and the window of ratios is based on the lower of said first and second speed ratios.

4. The diagnostic method of claim 1, wherein the step of determining if the transmission satisfies predetermined stability criteria includes computing a rate of change of the computed overall speed ratio, and determining if a magnitude of the computed rate of change is less than a predetermined threshold.

5. The diagnostic method of claim 1, wherein the step of determining if the computed overall ratio is stable over a given time interval includes the steps of:

comparing the measured output speed to a threshold speed; and determining a duration of the given time interval based on such comparison.

6. The diagnostic method of claim 1, where the transfer case includes an indicator switch for indicating the speed ratio provided by the transfer case, and the assumed speed ratio of said transfer case is based on an output of said indicator switch.

7. The diagnostic method of claim 6, including the step of:

indicating faulty operation of said indicator switch if the computed overall ratio is outside said window of ratios.

* * * * *